United States Patent
Alshinnawi et al.

(10) Patent No.: US 9,563,261 B2
(45) Date of Patent: *Feb. 7, 2017

(54) MANAGEMENT OF POWER CONSUMPTION IN LARGE COMPUTING CLUSTERS

(71) Applicant: International Business Machines Corporation, Armonk, NY (US)

(72) Inventors: Shareef F. Alshinnawi, Apex, NC (US); Gary D. Cudak, Wake Forest, NC (US); Christopher J. Hardee, Raleigh, NC (US); Edward S. Suffern, Chapel Hill, NC (US); J. Mark Weber, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/553,103

(22) Filed: Nov. 25, 2014

(65) Prior Publication Data

US 2016/0147285 A1 May 26, 2016

(51) Int. Cl.
| | |
|---|---|
| *G06F 1/26* | (2006.01) |
| *G06F 1/32* | (2006.01) |
| *G06F 9/48* | (2006.01) |
| *G06F 9/50* | (2006.01) |

(Continued)

(52) U.S. Cl.
CPC ............ *G06F 1/3287* (2013.01); *G06F 1/3206* (2013.01); *G06F 1/329* (2013.01); *G06F 1/3209* (2013.01); *G06F 9/4893* (2013.01); *G06F 9/50* (2013.01); *G06F 9/5094* (2013.01); *G06F 1/26* (2013.01); *G06F 1/266* (2013.01);

(Continued)

(58) Field of Classification Search
CPC ...... G06F 1/266; G06F 1/3206; G06F 1/3287; G06F 13/4022; G06F 13/4045; H04L 12/44
USPC ................................. 713/300, 320, 324, 330
See application file for complete search history.

(56) References Cited

U.S. PATENT DOCUMENTS

| | | | |
|---|---|---|---|
| 7,248,568 B1 * | 7/2007 | Loc ..................... | H04W 76/023 370/312 |
| 7,602,799 B2 | 10/2009 | Ikeda et al. | |
| 7,653,738 B2 | 1/2010 | Ikeda et al. | |

(Continued)

OTHER PUBLICATIONS

Linksys SE2800 8-Port Gigabit Ethernet Switch, Linksys, URL: www.amazon.com, accessed Aug. 13, 2014.

(Continued)

*Primary Examiner* — Michael J Brown
(74) *Attorney, Agent, or Firm* — Olive Law Group, PLLC

(57) ABSTRACT

Management of power consumption in large computing clusters is disclosed herein. According to an aspect, a computing device comprising a power manager may be configured to receive, via a communication interface, information associated with the cluster of computing nodes. The power manager of the computing device may also be configured to determine whether a switch is coupled to an inactive computing node of the cluster of computing nodes based on the received information. Further, the power manager of the computing device may be configured to communicate a command to the switch to remove power supplied to a switch port of the switch coupled to the inactive computing node in response to determining that the switch is coupled to an inactive computing node of the cluster of computing nodes.

3 Claims, 9 Drawing Sheets

(51) Int. Cl.
  *G06F 13/40* (2006.01)
  *H04L 12/44* (2006.01)
(52) U.S. Cl.
  CPC ...... *G06F 13/4022* (2013.01); *G06F 13/4045* (2013.01); *H04L 12/44* (2013.01)

(56) References Cited

U.S. PATENT DOCUMENTS

| | | |
|---|---|---|
| 8,098,658 B1 | 1/2012 | Ranganathan et al. |
| 8,261,114 B2 | 9/2012 | Diab et al. |
| 8,340,111 B1 | 12/2012 | Krivitski et al. |
| 8,345,675 B1 | 1/2013 | Raghunath et al. |
| 8,559,315 B2 | 10/2013 | Dudkowski et al. |
| 8,724,621 B2 | 5/2014 | Lin et al. |
| 2005/0027841 A1* | 2/2005 | Rolfe ................. H04L 41/0226 709/223 |
| 2005/0195742 A1* | 9/2005 | Klipper ................ H04L 12/417 370/235 |
| 2010/0064009 A1 | 3/2010 | Chen et al. |
| 2011/0245988 A1 | 10/2011 | Ingels et al. |
| 2012/0120958 A1 | 5/2012 | Mahadevan et al. |
| 2013/0070754 A1 | 3/2013 | Iovanna et al. |
| 2013/0195104 A1 | 8/2013 | Karnowski |

OTHER PUBLICATIONS

Chase, Jeffrey S. et al., Managing Energy and Server Resources in Hosting Centers, Dept. of Computer Science, Duke University, and IBM Research Triangle Park, ACM, 2001.
Xu, Mingwei et al., Greening Data Center Networks with Throughput-Guaranteed Power-Aware Routing, Computer Networks 57, pp. 2880-2899, 2013.

* cited by examiner

MANAGEMENT OF POWER CONSUMPTION IN LARGE COMPUTING CLUSTERS

TECHNICAL FIELD

The present invention is related to computing clusters, and more specifically, to management of power consumption in large computing clusters.

BACKGROUND

The management of power consumption in large high power performance is critical to the overall performance of these systems. There are various techniques for reducing power consumption. One technique involves placing any unused servers in a sleep state. However, these unused servers may be connected to network switch ports that are still active and remain powered on. Network switch ports connected to unused servers may still actively auto-negotiate link connectivity, thus unnecessarily consuming power. Since large computing clusters may include thousands of nodes, large amounts of power may be wasted in such computing clusters. For at least these reasons, it is desired to provide improved techniques and systems for reducing server power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are computing devices configured to manage power consumption in large computing clusters. According to an aspect, a computing device comprising a power manager may be configured to receive, via a communication interface, information associated with the cluster of computing nodes. The power manager of the computing device may also be configured to determine whether a switch is coupled to an inactive computing node of the cluster of computing nodes based on the received information. Further, the power manager of the computing device may also be configured to communicate a command to the switch to remove power supplied by a switch port of the switch coupled to the inactive computing node in response to determining that the switch is coupled to an inactive computing node of the cluster of computing nodes.

According to another aspect, a computing device comprising a power manager may be configured to determine whether activity among the cluster of computing nodes is fragmented. The power manager of the computing device may also be configured to reallocate the activity among the cluster of computing nodes such that the activity amongst the cluster of computing nodes is not fragmented in response to determining that the activity among the cluster of computing nodes is fragmented. The power manager of the computing device may also be configured to determine whether a switch of the plurality of switches is not coupled to an active computing node of the cluster of computing nodes in response to the reallocation of activity amongst the cluster of computing nodes. Further, the power manager of the computing device may be configured to communicate a command to the switch to power down in response to determining that the switch is not coupled to an active cluster of computing nodes connected to the switch.

According to another aspect, a computing device comprising an activity scheduler may be configured to receive, via a communication interface, information associated with a plurality of switches. The activity scheduler of the computing device may also be configured to receive a request to schedule activity for an inactive computing node of the cluster of computing nodes. The activity scheduler of the computing device may also be configured to determine whether one of a switch and a switch port of the switch coupled to the inactive computing node of the cluster of computing nodes is powered down based on the received information. The activity scheduler of the computing device may also be configured to communicate a command to the power manager to supply power to one of the switch and the switch port of the switch in response to determining the one of the switch and the switch port of the switch is powered down. Further, the activity scheduler of the computing device may be further configured to schedule activity for the inactive computing node to activate the inactive computing node.

According to another aspect, a computing device comprising a power manager may be configured to receive a command, via the communication interface, to supply power to one of switch and a switch port of the switch. The power manager of the computing device may also be configured to determine a time to supply power to one of a switch and switch port based on the received command. The power manager of the computing device may further be configured to communicate a command to one of the switch and the switch port to power up at the determined time.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
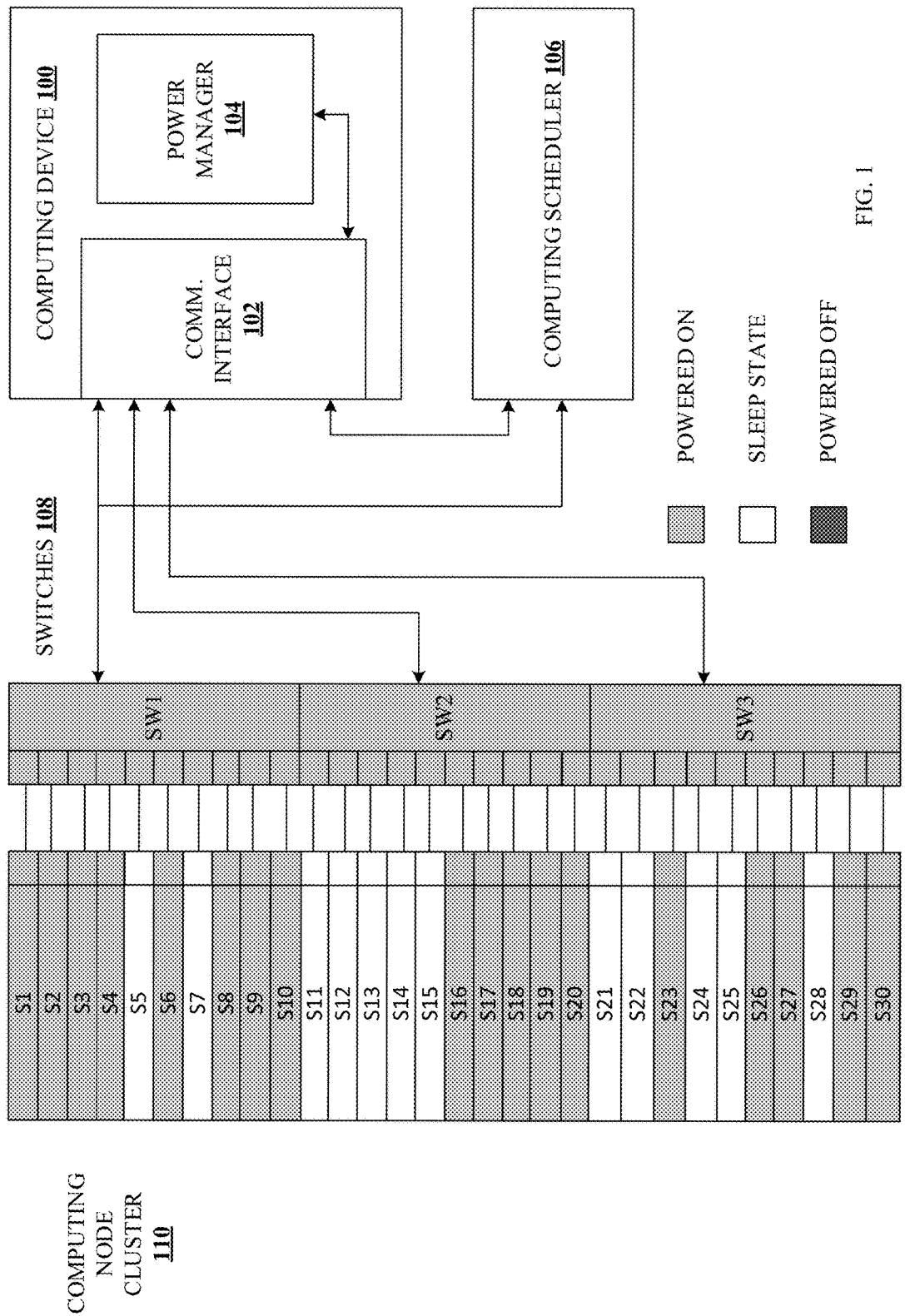
FIG. 1 is a diagram of an example system for managing power consumption in large computing clusters in accordance with embodiment of the present invention.

The present invention is now described in more detail. For example, FIG. 1 illustrates a diagram of an example system for managing power consumption in large computing clusters in accordance with embodiment of the present invention. Referring to FIG. 1, a computing device 100 may be configured to manage power consumption in a computing node cluster 110 in accordance with embodiments of the present invention. Also shown in FIG. 1, the computing device 100 may communicate with switch devices 108 (i.e., switches SW1, SW2, and SW3) and a computing scheduler 106 via a communication interface 102 in order to manage the power consumption in computing cluster 110. For example, computing device 100 may communicate with a switch SW1 of switches 108 via the communication interface 102. It is noted that although only three (3) switches are shown in FIG. 1, any suitable number of switches may be utilized.

The computing device 100 may also be configured to manage the power consumption of the computing node cluster 110 (i.e., nodes S1-S30) via switches 108 by utilizing a power manager 104, as shown in FIG. 1. The power manager 104 may be implemented by hardware, software, firmware, or combinations thereof. For example, the power manager 104 may include one or more processors and a memory configured to manage power consumption in the computing node cluster 110 in accordance with embodiments of the present invention as shown in FIG. 2.

Figure 2:
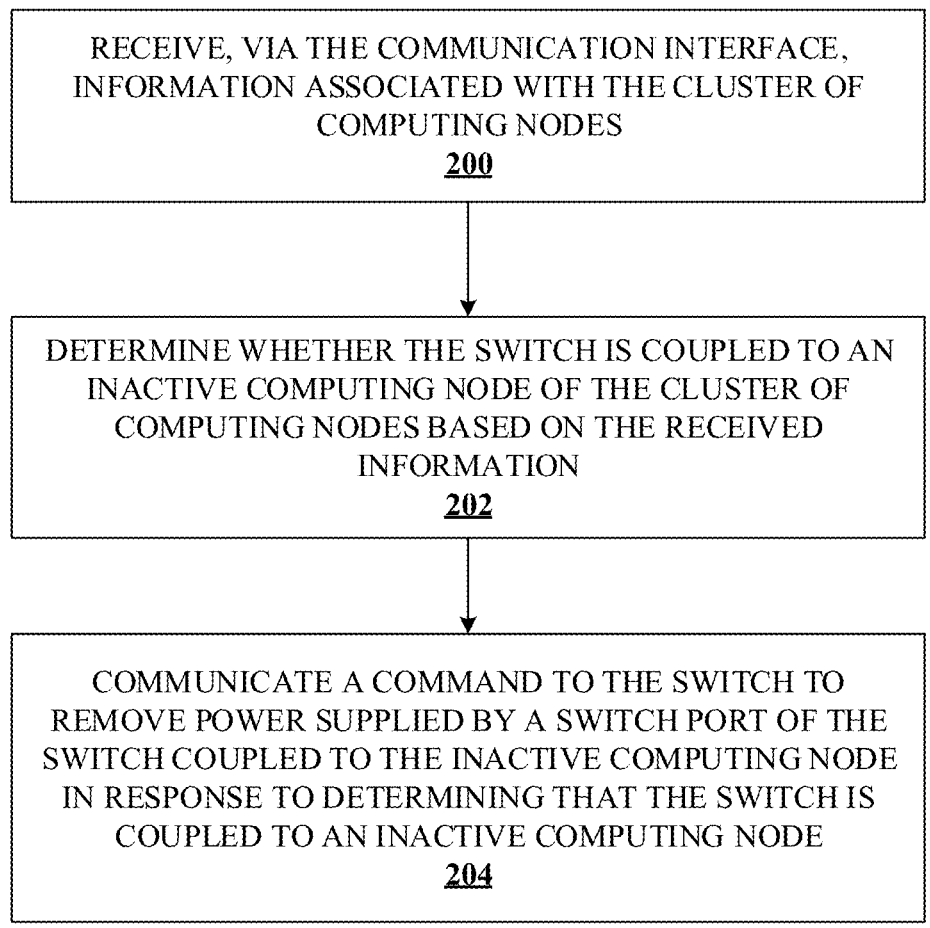
FIG. 2 is a flowchart of an example method for removing power supplied to a switch port of a switch coupled to an inactive computing node in a cluster of computing nodes in accordance with embodiments of the present invention.

In accordance with embodiments of the present invention, FIG. 2 illustrates a flowchart of an example method for removing power supplied to a switch port of a switch coupled to an inactive computing node in a cluster of computing nodes. The method of FIG. 2 is described by example as being implemented by the system of FIG. 1, although it should be understood that the method may alternatively be implemented by any suitable system.

Referring to FIG. 2, the method includes receiving 200, via a communication interface, information associated with the cluster of computing nodes. For example, the power manager 104 shown in FIG. 1 may be configured to receive, via the communicate interface 102, information associated with the cluster of computing nodes. For example, power manager 104 may be configured to receive, via communication interface 102, information associated with computing node cluster 110. The power manager 104 may receive the information via communication interface 102 from computing scheduler 106.

In one embodiment, the received information may identify an inactive computing node in the cluster of computing nodes. For example, FIG. 1 shows computing node cluster 110 including computing nodes S1-S30. In an example, computing nodes S1-S30 may be computing devices configured as servers in a large computing cluster such as, but not limited to, a cloud computing network. FIG. 1 also shows that each of computing nodes S1-S30 is coupled to at least one of switches 108. For example, computing nodes S1-S10 of computing node cluster 110 are coupled to switch SW1 of switches 108, computing nodes S11-S20 are coupled to switch SW2 of switches 108, and computing nodes S21-S30 are coupled to switch SW3 of switches 108. The computing device 100 may be configured to manage the power consumption of any number of computing nodes in computing node cluster via any number of switches. The number of switches and computing nodes depicted in FIG. 1 are for illustrative purposes only.

FIG. 1 also shows that some computing nodes of computing node cluster 110 can be either powered on (i.e., active) or in a sleep state (i.e., inactive). As shown in FIG. 1, computing nodes S1-S4, S6, S8-S10, S16-20, S23, S26-S27, and S29-S30 are powered on, or active. For example, in the embodiment in which the computing nodes are configured as servers in a large computing cluster such as, but not limited to, a cloud computing network, an active server can be actively receiving and executing job requests from the cloud computing network. Such activity may require the server to be powered on. Also shown in FIG. 1, computing nodes S5, S7, S11-15, S21-22, S24-25, and S28 are in either a sleep state or an inactive state. For example, in the same example in which the computing nodes are configured as servers, an inactive server may not be actively receiving or executing job requests from the cloud computing network. Thus, power in a computing network may be conserved is to put inactive computing nodes, or servers, in a sleep state.

In an example, the information identifying an inactive computing node may include an address associated with the inactive computing node. For example, power manager 104 may receive information identifying an address associated with inactive computing node of FIG. 1. The inactive computing node may be node S5. In another example, the address may be a media access control (MAC) address or other address of the inactive computing node.

Referring to FIG. 2, the method includes determining 202 whether the switch is coupled to an inactive computing node of the cluster of computing nodes based on the received information. Continuing with the example of FIG. 1, the power manager 104 may determine whether a switch is coupled to an inactive computing node of the cluster of computing nodes based on the received information. For example, the power manager 104 may maintain a configuration table associating each switch SW1-SW3 of switches 108 with each computing node S1-S30 of the computing node cluster 110. The configuration table may identify an inactive computing node coupled to a switch port of a switch. For example, a configuration table associated with the power manager 104 may identify that switch SW1 is coupled to inactive computing nodes S5 and S7. The configuration table may identify an inactive computing node using an address associated with the inactive computing node. Continuing the previous example, the configuration table associated with power manager 104 may identify inactive computing nodes S5 and S7 using addresses associated with inactive computing nodes S5 and S7.

The method of FIG. 2 includes communicating 204 a command to the switch to remove power supplied to a switch port of the switch coupled to the inactive computing node in response to determining that the switch is coupled to an inactive computing node. Continuing the aforementioned example, the power manager 104 may communicate a command to a switch to remove power supplied to a switch port of the switch coupled to an inactive computing node, as shown in FIG. 2, in response to determining that a switch is coupled to an inactive computing node. In an example, the command may include information identifying the inactive computing node. For example, the power manager 104 may communicate a command to switch SW1 to remove power supplied to the switch port of switch SW1 coupled to computing node S5. In this example, the command may include information identifying computing node S5 as the inactive computing node. In response to receipt of the command, the switch may remove power supplied to the switch port in accordance with the command.

Figure 3:
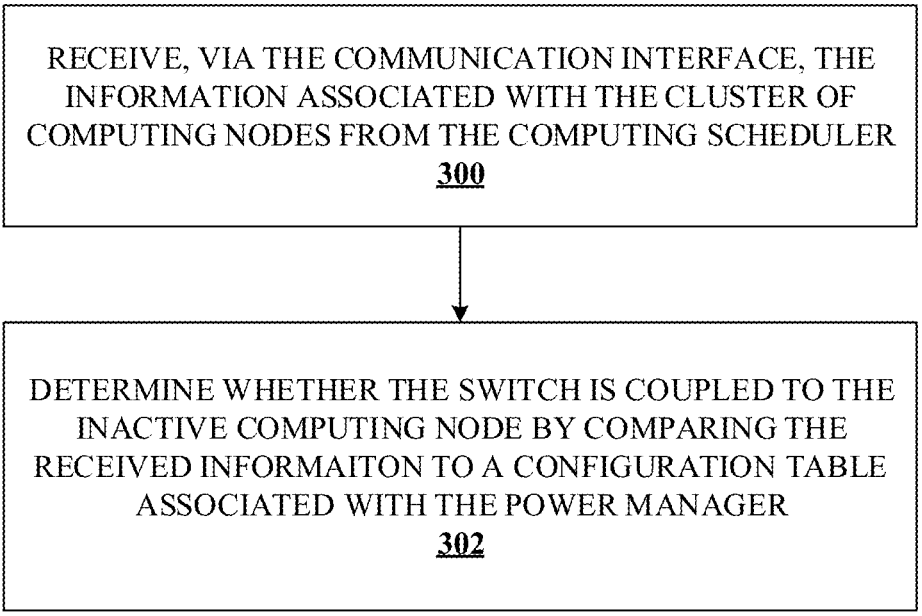
FIG. 3 is a flowchart of an example method for determining whether a switch is coupled to an inactive computing node in accordance with embodiments of the present invention.

FIG. 3 illustrates a flowchart of an example method for determining whether a switch is coupled to an inactive computing node in accordance with embodiments of the present invention. The method is described by example as being implemented by the system of FIG. 1, although it should be understood that the method may alternatively be implemented by any suitable system. Referring to FIG. 3, the method includes receiving 300, via the communication interface, the information associated with a cluster of computing nodes from the computing schedulers. In an example, as shown in FIG. 3, the power manager 104 may be configured to receive 300, via the communication interface, the information associated with the cluster of computing nodes from the computing scheduler 106.

FIG. 3 includes determining 302 whether the switch is coupled to the inactive computing node by comparing the received information to a configuration table associated with the power manager. Continuing the aforementioned example, the power manager 104 may determine whether a switch is coupled to the inactive computing node by comparing 302 the received information to a configuration table associated with the power manager 104. In response to receipt of the command, the switch may remove power supplied to the switch port in accordance with the command.

Figure 4:
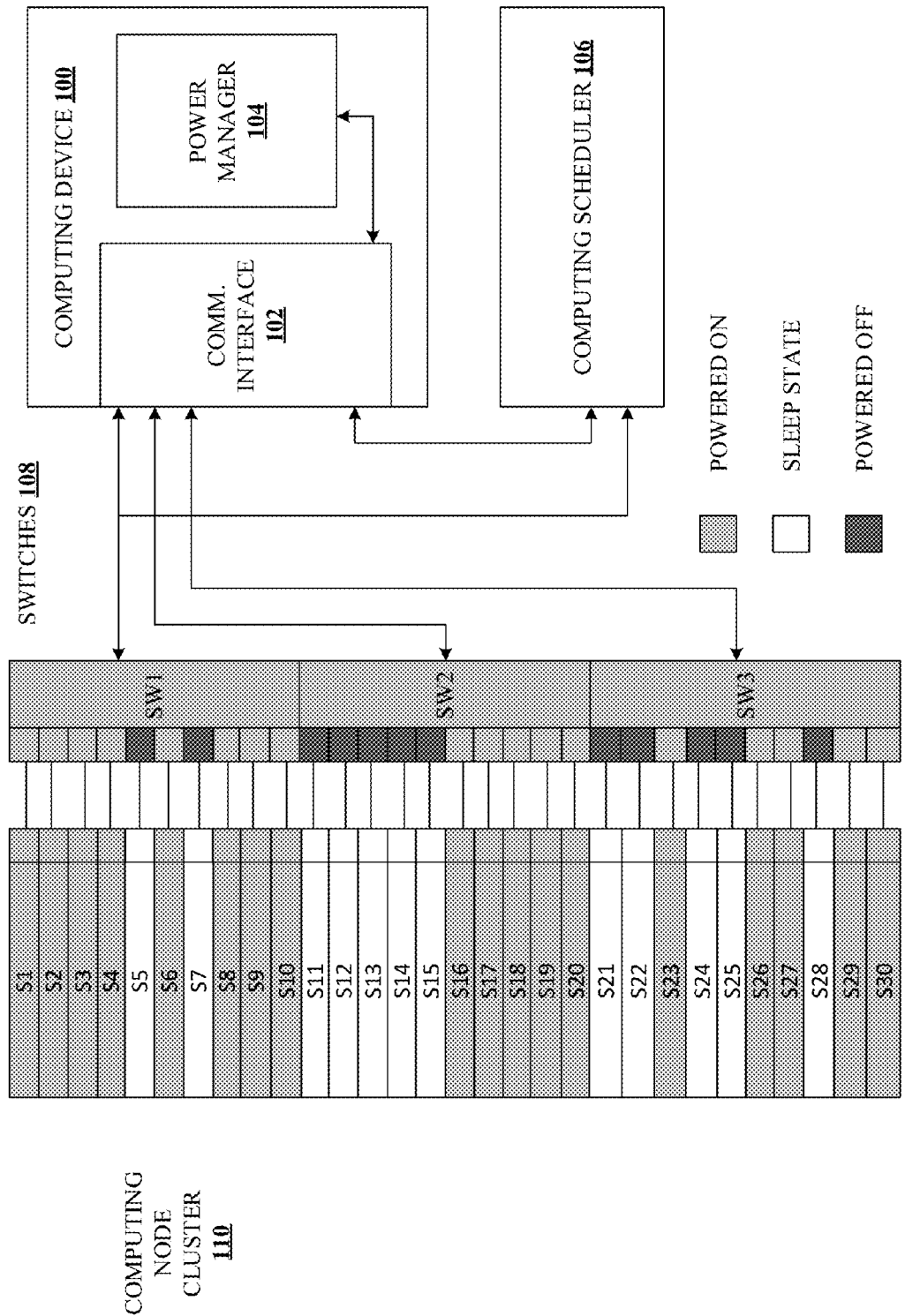
FIG. 4 is a diagram of an example system in which power is removed from switch ports coupled to inactive computing nodes in accordance with embodiments of the present invention.

FIG. 4 illustrates a diagram of an example system in which power is removed from switch ports coupled to inactive computing nodes in accordance with embodiments of the present invention. Referring to FIG. 4, switch SW1 has removed power supplied by the switch ports of switch SW1 coupled to computing nodes S5 and S7 respectively. Switch ports of switches SW2 and SW3 coupled to other inactive computing nodes have also removed power to those switch ports, as shown in FIG. 4. Thus, power consumption throughout the system shown in FIG. 4 is reduced and cost savings obtained.

In another example, power consumption reduction and cost savings may be obtained by powering down an entire switch or multiple switches. This may not be possible in some systems when activity among the computing nodes throughout the computing cluster is fragmented. For example, job requests and fulfillment may be unevenly dispersed amongst the computing nodes of computing cluster such that there is fragmentation. Although, the activity among a cluster of computing nodes may be defragmented to enable the system to power down an entire, or multiple, switches in the system to realize power savings.

Figure 5:
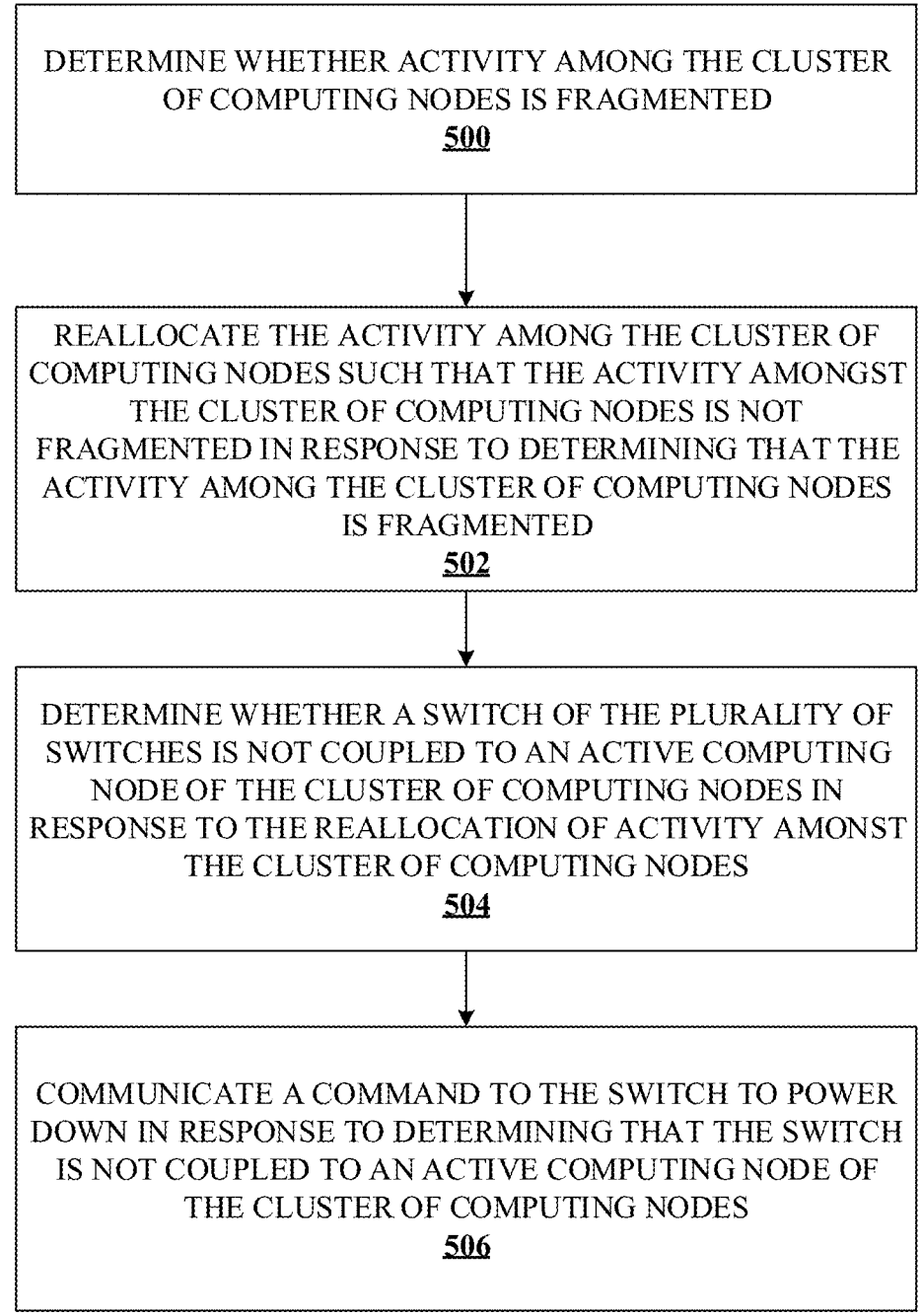
FIG. 5 is flowchart of an example method of reallocating activity among the cluster of computing nodes in accordance with embodiments of the present invention.

FIG. 5 illustrates a flowchart of an example method of reallocating activity among the cluster of computing nodes in accordance with embodiments of the present invention. The method of FIG. 5 may be implemented by the system shown in FIG. 4, although it should be understood that the method may be implemented by any suitable system. Referring to FIG. 5, the method includes determining 500 whether activity among the cluster of computing nodes is fragmented. For example, referring to FIG. 4, the power manager 102 may determine whether activity among the cluster of computing nodes is fragmented. In a particular example, the power manager 100 may be configured to determine whether activity among the computing nodes S1-S30 of computing node cluster 110 is fragmented. In another example, the power manager 100 may receive the information identifying inactive nodes from the computing scheduler 106. In an example, the information may indicate that the activity amongst the cluster of computing nodes is fragmented. For example, the power manager 100 may receive information from computing scheduler 106 indicating that the activity amongst computing nodes S1-S30 of computing cluster 110 is fragmented.

The method of FIG. 5 includes reallocating 502 the activity among the cluster of computing nodes such that the activity amongst the cluster of computing nodes is not fragmented in response to determining that the activity among the cluster of computing nodes is fragmented. Continuing the aforementioned example, the power manager 102 shown in FIG. 4 may reallocate the activity among the cluster of computing nodes such that activity amongst the cluster of computing nodes is not fragmented in response to determining that the activity among the cluster of computing nodes is fragmented. For example, the power manager 102 may reallocate activity among the computing node cluster 110 in response to determining that the activity among computing nodes S1-S30 of computing node cluster 110 is fragmented. For example, the power manager 102 may communicate a command to computing scheduler 106 to defragment the activity among computing nodes S1-S30 of computing node cluster 110.

Figure 6:
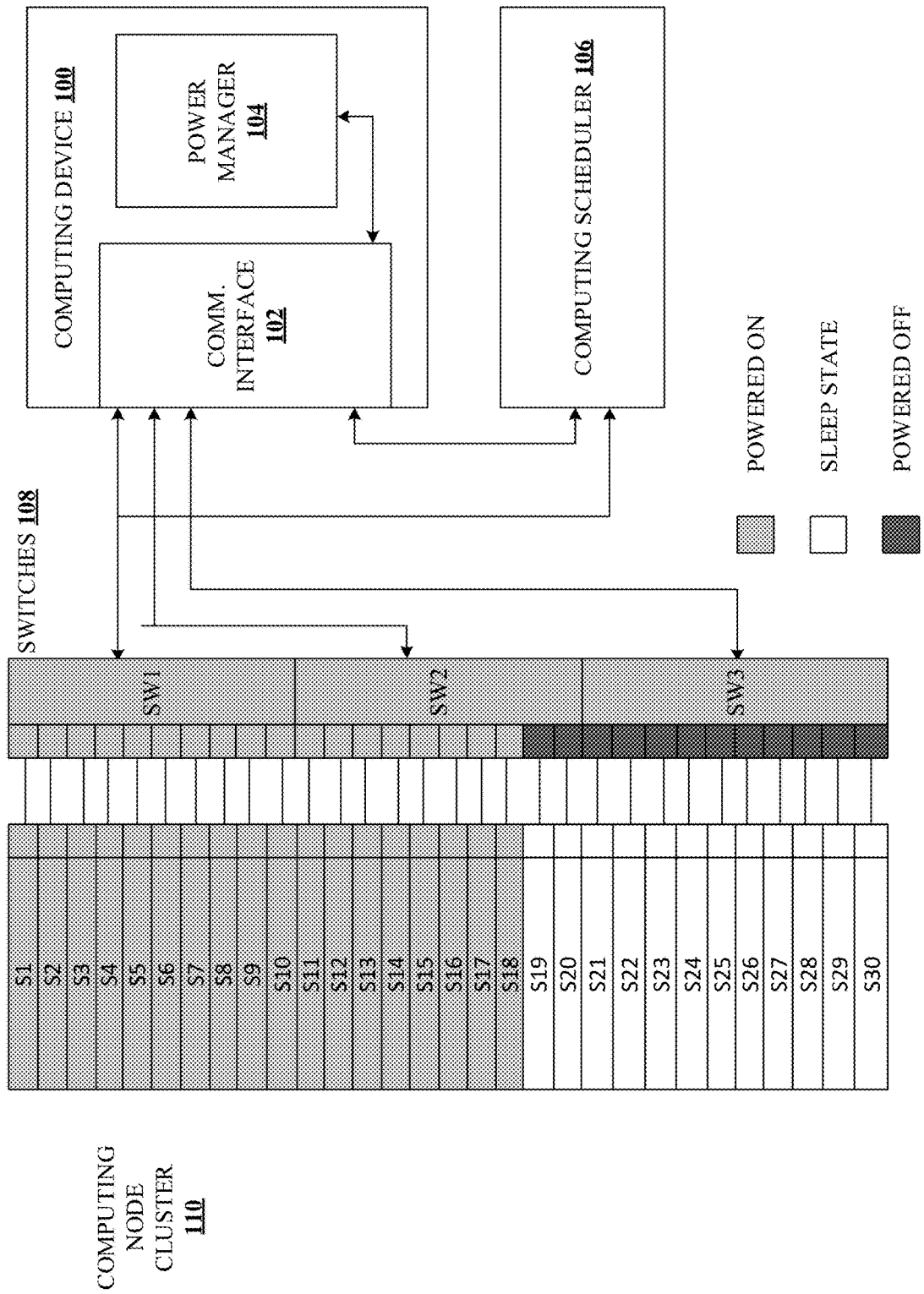
FIG. 6 is a diagram of an example system in which power is removed from switch ports and a switch coupled to inactive computing nodes after reallocation of activity amongst the cluster of computing nodes in accordance with embodiments of the present invention.

FIG. 6 illustrates a diagram of an example system showing the results of reallocating of activity among the cluster of computing nodes such that the activity amongst the cluster of computing nodes is not fragmented. For example, activity amongst computing nodes S1-S30 of computing node cluster 710 has been reallocated such that computing nodes S1-S18 are powered on or active. As shown in FIG. 6, computing nodes S19-S30 are in a sleep state or on standby. The figure also shows that the switch ports of switches SW2 and SW3 coupled to the inactive computing nodes are powered down in accordance with embodiments of the present disclosure.

Returning to FIG. 5, the method includes determining whether a switch of a plurality of switches is not coupled to an active computing node of the cluster of computing nodes in response to the reallocation of activity amongst the cluster of computing nodes. Continuing the example, the power manager 104 may determine whether a switch is not coupled to an active computing node of the cluster of computing nodes in response to the reallocation of activity amongst the cluster of computing nodes. For example, the power manager 104 may determine whether switches SW1-SW3 is not coupled to an active computing node of computing node cluster 110.

Figure 7:
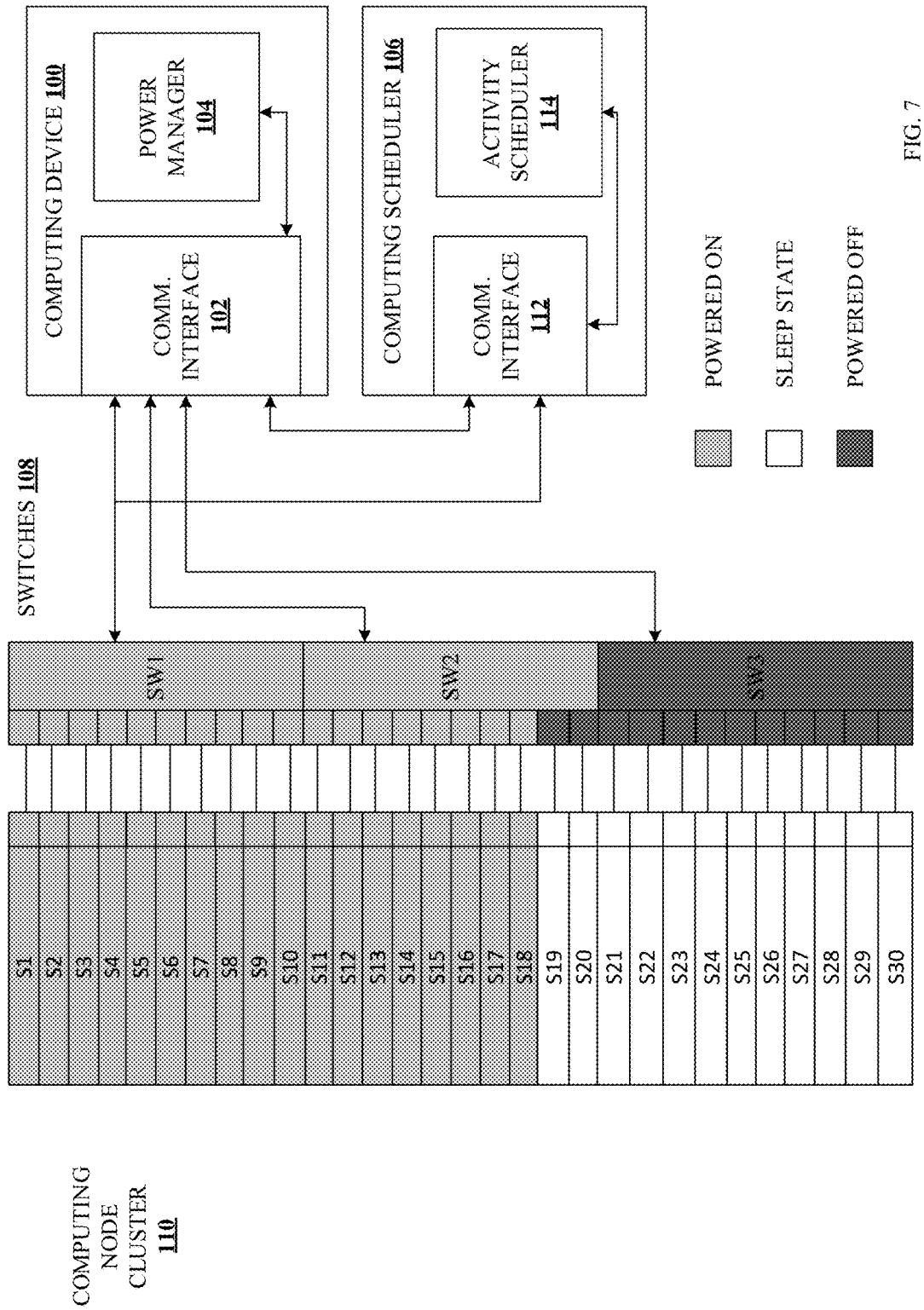
FIG. 7 is a diagram of an example system for scheduling activity for an inactive computing node of the cluster of computing nodes in accordance with embodiments of the present invention.

The method of FIG. 5 includes communicating 506 a command to the switch to power down in response to determining that the switch is not coupled to an active computing node of the cluster of computing nodes. Continuing the example, the power manager 104 may communicate a command to the switch to power down in response to determining that the switch is not coupled to an active computing node of the cluster of computing nodes. For example, power manager 104 may communicate a command to switch SW3 of switches 108 to power down. In an example, FIG. 7 shows switch SW3 of switches 108 powered off in response to receiving a command to power down. Therefore, power savings may be realized by deactivating, or powering down, switches not coupled to any active computing nodes in a large computing cluster.

Over time, inactive computing nodes may be activated for immediate or future job requests within a large computing node cluster. In accordance with embodiments of the present invention, deactivated switch ports and/or switches may be activated prior to activating inactive computing nodes coupled to the deactivated switch ports and/or switches. The power manager 104 may control activation of switch ports and/or switches in this manner.

In accordance with previous embodiments of the present disclosure, FIG. 7 illustrates a diagram of an example system for scheduling activity for an inactive computing node of the cluster of computing nodes. Referring to FIG. 7, the power manager 104 may communicate with the computing scheduler 106 via communication interface 112 to manage power consumption within a large computing node cluster, such as the computing node cluster 110. The computing scheduler 106 may schedule activity, or job requests, for computing nodes S1-S30 within computing node cluster 110 using the activity scheduler 114. The activity scheduler 114 may be implemented by hardware, software, firmware, or combinations thereof. For example, the activity scheduler 114 may include one or more processors and a memory configured to schedule activity in a cluster of computing nodes.

Figure 8:
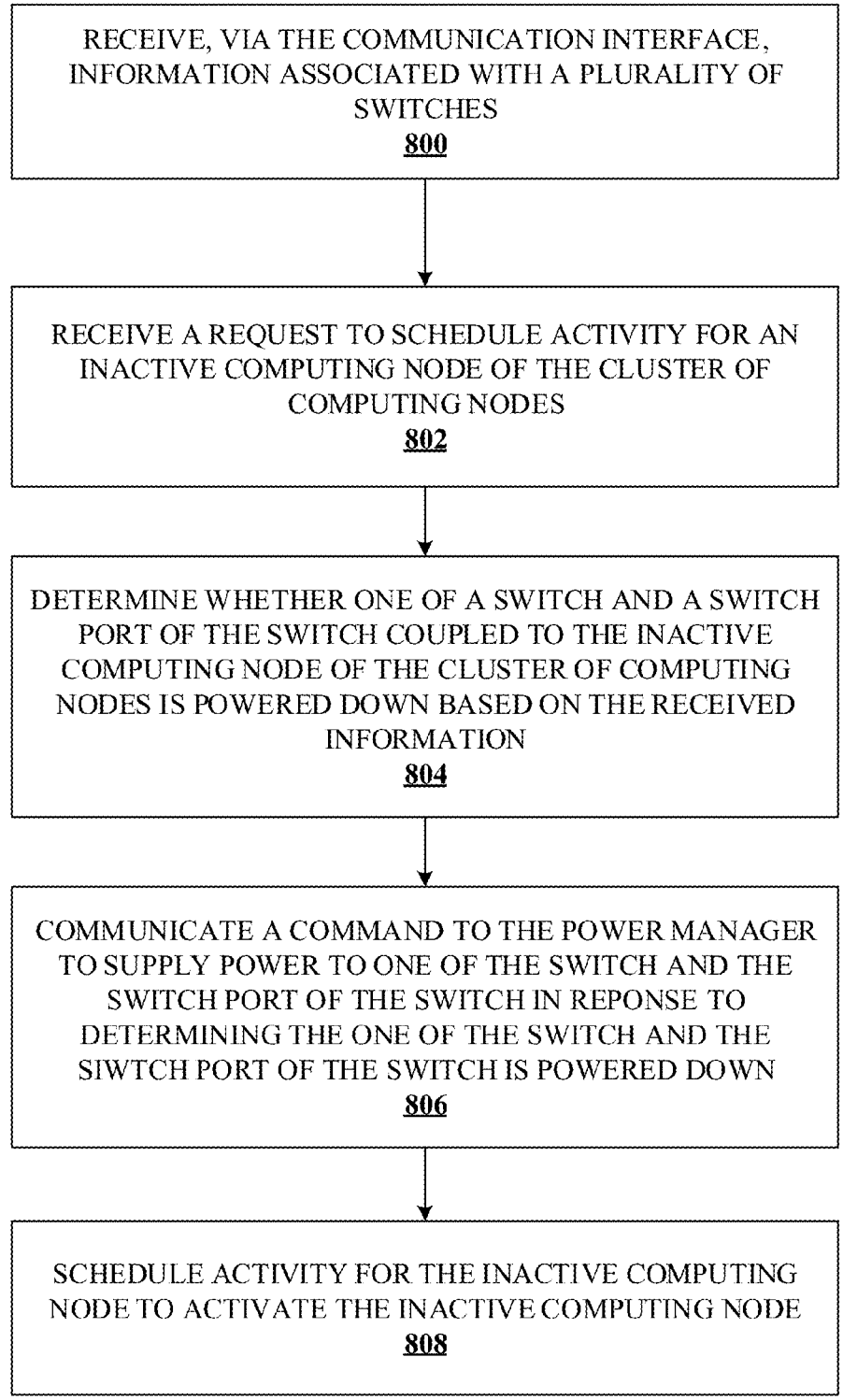
FIG. 8 is a flowchart of an example method for supplying power to a switch or a switch port of the switch coupled to an inactive computing node for scheduling activity on the inactive computing node in accordance with embodiments of the present invention.

In accordance with embodiments of the present invention, FIG. 8 illustrates a flowchart of an example method for supplying power to a switch or a switch port of the switch coupled to an inactive computing node for scheduling activity on the inactive computing node. The method is described by example as being implemented by the system of FIG. 7, although it should be understood that the method may be implemented by any suitable system. Referring to FIG. 8, the method includes receiving 800, via the communication interface, information associated with a plurality of switches. For example, the activity scheduler 114 shown in FIG. 7 may receive information associated with a plurality of switches. For example, activity scheduler 114 of computing scheduler 106 may be configured to receive, via communication interface 114, information associated with switches 108. In a particular example, the activity scheduler 114 may receive the information, via communication interface, from the power manager 104. In another example, the information associated with the switches may indicate that a switch or a switch port of the switch is powered down. Continuing the previous example, the information may indicate that switch SW3 of switches 108 and its associated switch ports are powered down, as shown in FIG. 7. The information may also indicate, as shown in FIG. 7, that two switch ports of switch SW2 are powered down.

Returning to FIG. 8, the method includes receiving 802 a request to schedule activity for an inactive computing node of the cluster of computing nodes. Continuing the aforementioned example, the activity scheduler 114 may receive a request to schedule activity for an inactive computing node of the cluster of computing nodes. For example, the activity scheduler 114 may receive a request to schedule activity for inactive computing nodes S19-S21. The method of FIG. 8 includes determining whether one of a switch and a switch port of the switch coupled to the inactive computing node of the cluster of computing nodes is powered down based on the received information. For example, the activity scheduler 114 may determine whether a switch or a switch port of the switch coupled to the inactive computing node of the cluster of computing nodes is powered down based on the received information. In a particular example, the activity scheduler 114 may determine whether switch SW2 and switch ports coupled to inactive computing nodes S19 and S20 are inactive, or powered off based on the received information. The activity scheduler 114 may determine whether switch SW3 and the switch port of switch SW3 coupled to inactive computing node S21 are also inactive, or powered off, based on the received information.

In response to determining that the one of the switch and the switch port of the switch is powered down, the method of FIG. 8 includes communicating a command to a power manager to supply power to one of the switch and the switch port of the switch. Continuing the example, the activity scheduler 114 may communicate 806 a command to the power manager 104 to supply power to one of the switch and the switch port. In one embodiment, the command may comprise information identifying the inactive computing node. For example, activity scheduler 114 may communicate a command to the power manager 104 to supply power to one of the switch and the switch port coupled inactive computing nodes S19-S21.

Figure 9:
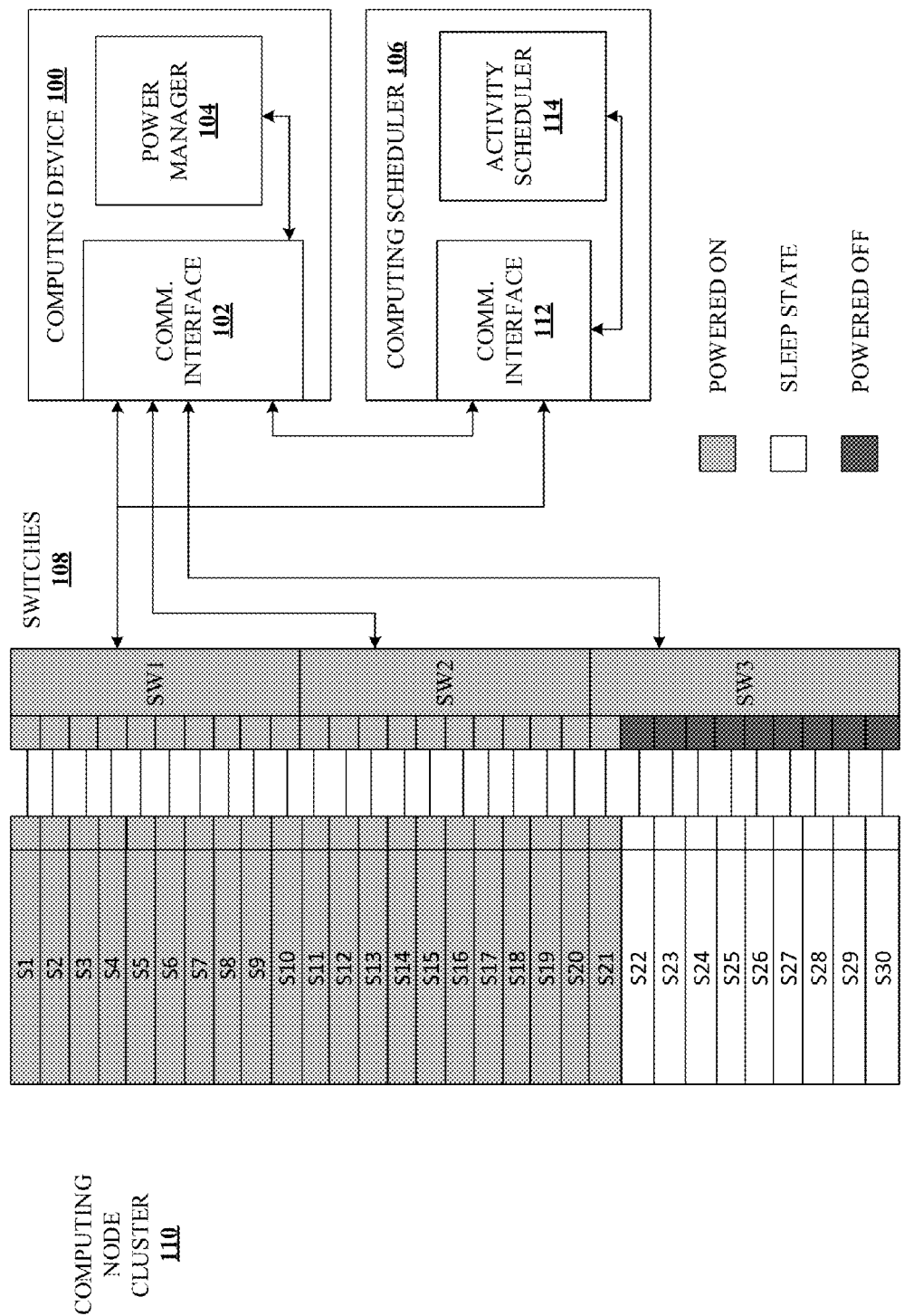
FIG. 9 is a diagram of an example system in which one of a switch and a switch port of the switch have been activated and inactive computing nodes activated in accordance with embodiments of the present invention.

The method of FIG. 8 includes scheduling 808 activity for the inactive computing node to activate the inactive computing node. Continuing the aforementioned example, the activity scheduler 114 may schedule activity for the inactive computing node to activate the inactive computing node. As shown in the example of FIG. 9, computing nodes S19-S20 are activated and power supplied to the switch ports of switch SW2 of switches 108 coupled to computing nodes S19-S20. FIG. 9 also shows that power has been supplied to switch SW3 of switches 108 and the switch port of switch SW3 coupled to newly-activated computing node S21.

To maximize power savings within a large computing cluster, it may be beneficial to intelligently power one of a switch and switch port to coincide with the execution time of a scheduled activity for a computing node. For example, if activity, or a job request, scheduled for computing node S21 is to be executed in 1 minute 30 seconds, and it takes 15 seconds to awaken a link, power one of a switch and switch port in 1 minute 15 seconds.

In accordance with embodiments of the present disclosure, the power manager 104 may also be configured to receive a command, via the communication interface, to supply power to one of switch and a switch port of the switch. For example, power manager 1004 may receive a command via communication interface 102 to supply power to one of a switch and a switch port of the switch. In accordance with previous embodiments, the power manager 104 may be configured to receive a command, via the communication interface, to supply power to one of a switch and a switch port of the switch from a computing scheduler. For example, the power manager 104 may be configured to receive a command, via communication interface 102, to supply power to one of switch SW3 of switches 108 and a switch port of the switch SW3 from computing scheduler 106. In accordance with previous embodiments, the command may comprise information identifying the inactive computing node. For example, the command may identify inactive computing node S21 coupled to a switch port of switch SW3 of switches 108. In another embodiment, the command may also identify the execution time of a scheduled activity for the inactive computing node. For example, the command may identify an execution time of 1 minute 30 seconds for the scheduled activity for computing node S21 coupled to switch SW3 of switches 108.

The power manager 104 may also be configured to determine a time to supply power to one of a switch and switch port based on the received command. In one embodiment, the power manager 104 determines a time to supply power to one of the switch and the switch port using a configuration file associated with the one of the switch and the switch port. The configuration file may identify a time period required to awaken one of the switch and the switch port. For example, power manager 104 may access a configuration file identifying an approximate time period of 15 seconds to power up one of switch SW3 of switches 108 and a switch port of switch SW3. The approximate times provided are for example only and are not limited to these examples.

In a further embodiment, the power manager 104 may also be configured to determine a time to supply power to one of the switch and the switch port based on the identified time period required to awaken one of the switch and the switch port and the identified execution time of a scheduled activity for the inactive computing node. Continuing the previous examples, the power manager 104 may determine a time of 1 minute and 15 seconds to awaken one of a switch and a switch port based on the execution time of 1 minute and 30 seconds identified in the received command and the 15 seconds required to power up one of a switch SW3 of switches 108 and a switch port of switch SW3 identified in the configuration file.

The power manager 104 may also be configured to supply power to one of the switch and switch port at the determined time. For example, power manager 104 may be configured to supply power to one of switch SW3 of switches 108 and a switch port of switch SW3, in 1 minute and 15 seconds to ensure the switch SW3 of switches 108 and a switch port of switch SW3 are powered on, or activated, at the execution time of the scheduled activity for activated computing node S21.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computing device comprising:
   a communication interface configured to communicate with a cluster of computing nodes and a power manager of a plurality of switches coupled to each computing node of the cluster of computing nodes; and
   an activity scheduler comprising at least one processor and memory configured to:
      receive, via the communication interface, information associated with the plurality of switches;
      receive a request to schedule activity for an inactive computing node of the cluster of computing nodes;
      determine whether one of a switch and a switch port of the switch coupled to the inactive computing node of the cluster of computing nodes is powered down based on the received information;
      in response to determining the one of the switch and the switch port of the switch is powered down, communicate a command to the power manager to supply power to one of the switch and the switch port of the switch;
      schedule activity for the inactive computing node to activate the inactive computing node.

2. The computing device of claim 1, wherein the information associated with the plurality of switches indicates that the one of the switch and the switch port of the switch is powered down.

3. The computing device of claim 1, wherein the command comprises information identifying the inactive computing node.

* * * * *